United States Patent
Zhuang et al.

(10) Patent No.: US 10,459,441 B2
(45) Date of Patent: Oct. 29, 2019

(54) METHOD AND SYSTEM FOR OPERATING AUTONOMOUS DRIVING VEHICLES BASED ON MOTION PLANS

(71) Applicant: Baidu USA LLC, Sunnyvale, CA (US)

(72) Inventors: Li Zhuang, Santa Clara, CA (US); Guang Yang, San Jose, CA (US); Jingao Wang, Saratoga, CA (US)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/396,214

(22) Filed: Dec. 30, 2016

(65) Prior Publication Data

US 2018/0188727 A1 Jul. 5, 2018

(51) Int. Cl.
*G05D 1/00* (2006.01)
*B60W 50/035* (2012.01)
*B60W 50/00* (2006.01)

(52) U.S. Cl.
CPC ......... *G05D 1/0088* (2013.01); *B60W 50/035* (2013.01); *B60W 2050/0026* (2013.01); *B60W 2050/0089* (2013.01); *B60W 2050/0096* (2013.01); *B60W 2520/06* (2013.01); *B60W 2520/10* (2013.01); *B60W 2520/105* (2013.01); *B60W 2550/12* (2013.01); *G05D 2201/0213* (2013.01)

(58) Field of Classification Search
USPC ......................................................... 701/23
See application file for complete search history.

(56) References Cited

U.S. PATENT DOCUMENTS

| 5,229,941 A | 7/1993 | Hattori |
| 5,270,628 A | 12/1993 | Noguchi et al. |
| 5,956,250 A | 9/1999 | Gudat et al. |
| 7,590,589 B2 * | 9/2009 | Hoffberg ............. G06Q 20/401 |
| | | 705/37 |
| 7,831,649 B2 | 11/2010 | Cho et al. |

(Continued)

FOREIGN PATENT DOCUMENTS

WO 2014139821 9/2014

OTHER PUBLICATIONS

R. Biolorusets, et al., Web Services Reliable Messaging Protocol (WS-ReliableMessaging) (Mar. 13, 2003).*

(Continued)

*Primary Examiner* — Jean Paul Cass
(74) *Attorney, Agent, or Firm* — Womble Bond Dickinson (US) LLP

(57) ABSTRACT

In one embodiment, autonomous driving control for an autonomous vehicle is provided by determining a first state of the autonomous vehicle from among a number of states and determining whether one or more conditions have been satisfied, based on current information and historical information of the autonomous vehicle. A next state of the autonomous vehicle and a transition of the autonomous vehicle from the first state to the next state are determined, based on the one or more conditions that are determined to have been satisfied. Based on the transition of the autonomous vehicle, one of a plurality of motion plans is selected.

18 Claims, 9 Drawing Sheets

(56) References Cited

U.S. PATENT DOCUMENTS

| | | | | |
|---|---|---|---|---|
| 7,962,385 | B2* | 6/2011 | Falk | G06Q 10/10 |
| | | | | 705/35 |
| 8,849,494 | B1* | 9/2014 | Herbach | B60W 30/00 |
| | | | | 701/24 |
| 8,996,224 | B1* | 3/2015 | Herbach | G05D 1/0011 |
| | | | | 180/116 |
| 9,079,587 | B1* | 7/2015 | Rupp | G05D 1/0289 |
| 9,229,453 | B1* | 1/2016 | Lee | G05D 1/0214 |
| 9,708,000 | B2* | 7/2017 | Hafner | B62D 13/06 |
| 9,751,558 | B2* | 9/2017 | Lavoie | B62D 6/10 |
| 9,755,941 | B2* | 9/2017 | Ameixieira | H04L 5/0037 |
| 9,783,230 | B2* | 10/2017 | Hafner | B62D 13/06 |
| 9,809,219 | B2* | 11/2017 | Agnew | B60W 30/09 |
| 9,818,136 | B1* | 11/2017 | Hoffberg | G06Q 30/0207 |
| 9,821,801 | B2* | 11/2017 | Di Cairano | B60W 30/09 |
| 9,829,883 | B1* | 11/2017 | Lavoie | G05D 1/0016 |
| 9,834,224 | B2* | 12/2017 | Gordon | B60W 50/082 |
| 9,840,240 | B2* | 12/2017 | Trombley | B60T 8/1708 |
| 9,849,364 | B2* | 12/2017 | Tran | H04L 67/12 |
| 2010/0228427 | A1 | 9/2010 | Anderson et al. | |
| 2015/0260531 | A1 | 9/2015 | Ehsani et al. | |
| 2017/0011465 | A1* | 1/2017 | Anastassov | G06Q 40/08 |
| 2017/0311534 | A1* | 11/2017 | Rusciolelli | A01B 79/005 |
| 2017/0316692 | A1* | 11/2017 | Rusciolelli | G08G 1/164 |
| 2017/0337813 | A1* | 11/2017 | Taylor | G08G 1/0141 |
| 2017/0351261 | A1* | 12/2017 | Levinson | G01S 17/42 |
| 2018/0149267 | A1* | 5/2018 | Newman | F16H 63/3491 |

OTHER PUBLICATIONS

Widepedia article https://en.wikipedia.org/wiki/WS-ReliableMessaging).( Feb. 9, 2019).*

Kuwata, Yoshiaki, et al, "Real-Time Motion Planning With Applications to Autonomous Urban Driving," IEEE Transactions on Control Systems Technology, vol. 17, No. 5, Sep. 2009, pp. 1105-1118.

* cited by examiner

500

| TRANSITION | PLAN |
|---|---|
| INITIAL → NORMAL | A |
| NORMAL → STOP | B |
| NORMAL → ABNORMAL | C |
| ABNORMAL → NORMAL | D |
| ABNORMAL → STOP | E |
| ABNORMAL → END | F |
| STOP → END | G |
| NORMAL → END | H |

| STATE | CATEGORY OF CONDITIONS | | | |
|---|---|---|---|---|
| | 1 | 2 | 3 | 4 |
| INITIAL | NORMAL | ABNORMAL | STOP | END |
| NORMAL | ABNORMAL | STOP | END | |
| ABNORMAL | NORMAL | STOP | END | |
| STOP | END | | | |

FIG. 6

METHOD AND SYSTEM FOR OPERATING AUTONOMOUS DRIVING VEHICLES BASED ON MOTION PLANS

TECHNICAL FIELD

Embodiments of the present disclosure relate generally to operating autonomous vehicles. More particularly, embodiments of the disclosure relate to autonomously selecting a driving motion plan for an autonomous vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

BRIEF DESCRIPTION OF THE DRAWINGS

Embodiments of the disclosure are illustrated by way of example and not limitation in the figures of the accompanying drawings in which like references indicate similar elements.

FIG. 5 is a lookup table including transitions between states of the autonomous vehicle and corresponding motion plans according to one embodiment.

FIG. 6 is a lookup table including conditions related to the autonomous vehicle and corresponding next steps of the autonomous vehicle according to one embodiment.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment.

According to some embodiments, autonomous driving control is provided for an autonomous vehicle changing states. A first state of the autonomous vehicle is determined from among a number of states based on current information of the autonomous vehicle and historical information of the autonomous vehicle. Also, based on the current information of the autonomous vehicle and the historical information of the autonomous vehicle, one or more conditions are determined to have been satisfied. Based on the one or more conditions that are determined to have been satisfied, a next state of the autonomous vehicle is determined from among the number of states and a transition of the autonomous vehicle is determined from the first state to the next state. A motion plan is then selected from multiple motion plans stored in a memory based on the transition of the autonomous vehicle. The autonomous vehicle is then driven or controlled based on the selected motion plan. A motion plan includes information or parameters regarding how to control or drive an autonomous vehicle, such as, for example, speed, direction, curvature, stop distance, lane changing speed and distance, whether the vehicle should over take or yield, etc. For different driving environment or scenario, a suitable motion plan may be utilized to control an autonomous vehicle. A motion plan further includes certain history of controlling the vehicle under the same or similar circumstances or driving condition.

Figure 1:
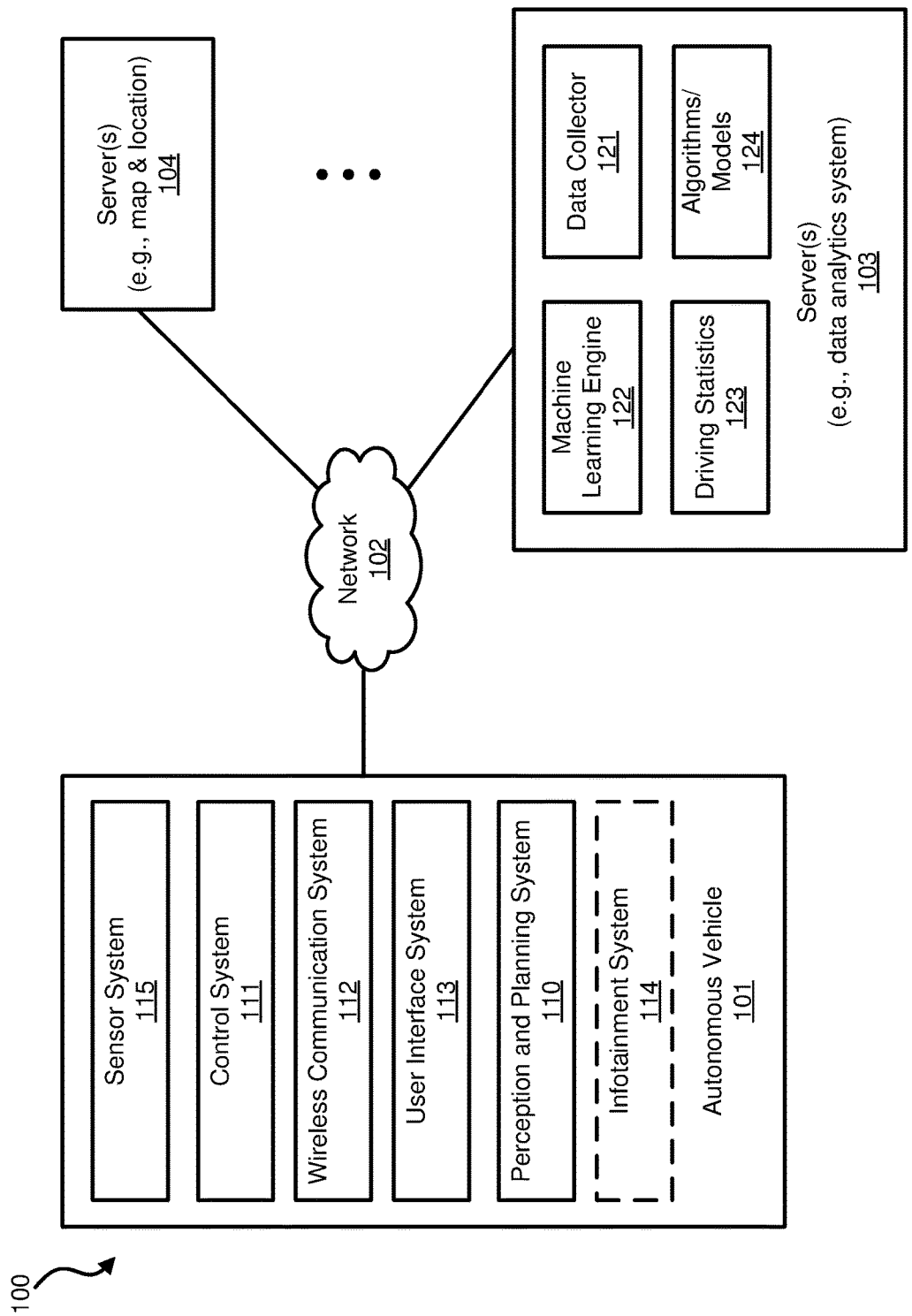
FIG. 1 is a block diagram illustrating a networked system according to one embodiment.

FIG. 1 is a block diagram illustrating an autonomous vehicle network configuration according to one embodiment. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc. In the embodiment of FIG. 1, server 103 includes machine learning engine 122, data collector 121, driving statistics 123 and algorithms and models 124, such as finite state machines (FSMs). The FSMs can be utilized to determine a status or state of an autonomous driving vehicle. Based on the state or status of the vehicle, a motion plan can be selected to drive the vehicle. A motion plan may include sufficient information regarding how to plan and control the vehicle, particularly in view of prior driving experiences or driving statistics of the vehicle under the same or similar driving environment.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
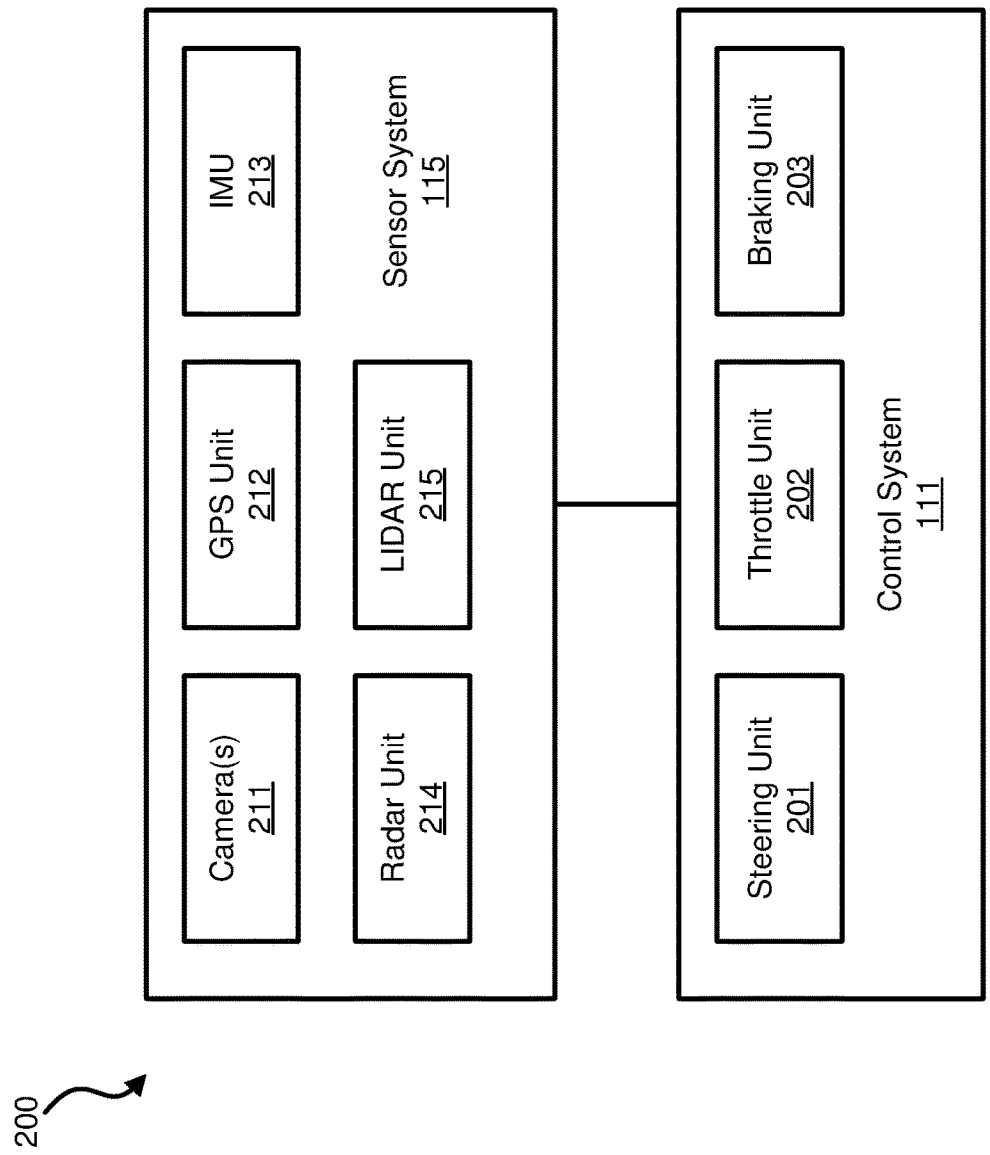
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

According to one embodiment, autonomous vehicle 101 may further include infotainment system 114 to provide information and entertainment to passengers of vehicle 101. The information and entertainment content may be received, compiled, and rendered based on content information stored locally and/or remotely (e.g., provided by servers 103-104). For example, the information may be streamed in real-time from any of servers 103-104 over network 102 and displayed on a display device of vehicle 101. The information may be augmented with local information captured in real-time, for example, by one or more cameras and the augmented content can then be displayed in a virtual reality manner.

Figure 3A:
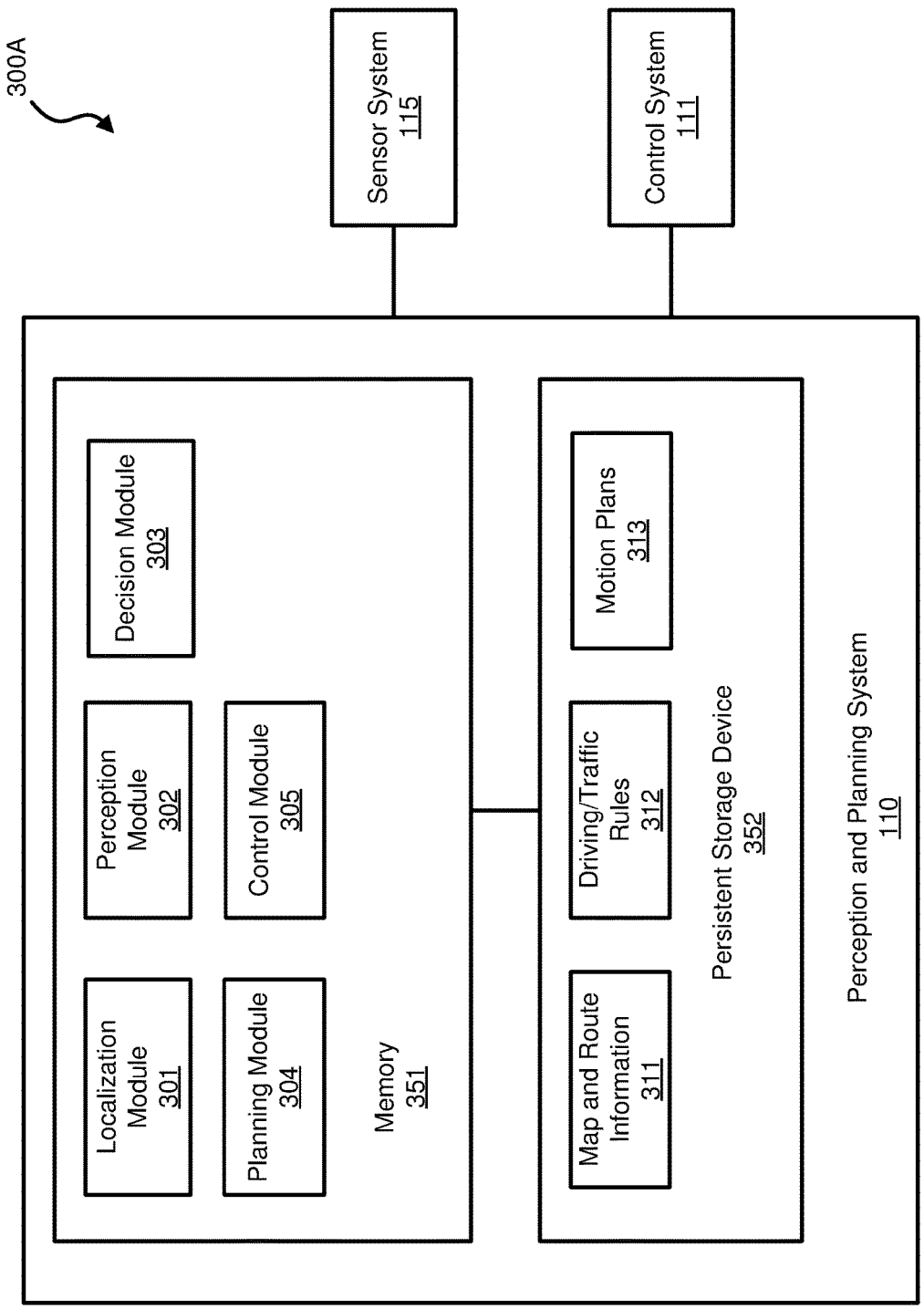
FIG. 3A is a block diagram illustrating an example of a perception and planning system used with an autonomous vehicle according to one embodiment.

FIG. 3A is a block diagram illustrating an example of a perception and planning system used with an autonomous vehicle according to one embodiment. System 300A may be implemented as a part of autonomous vehicle 101 of FIG. 1 including, but is not limited to, perception and planning system 110, control system 111, and sensor system 115. Referring to FIG. 3A, perception and planning system 110 includes, but is not limited to, localization module 301, perception module 302, decision module 303, planning module 304, control module 305, map and route information 311, driving/traffic rules 312, and motion plans 313.

Some or all of modules 301-305 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-305 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules, which may be stored in persistent storage device 352 (not shown).

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 3B:
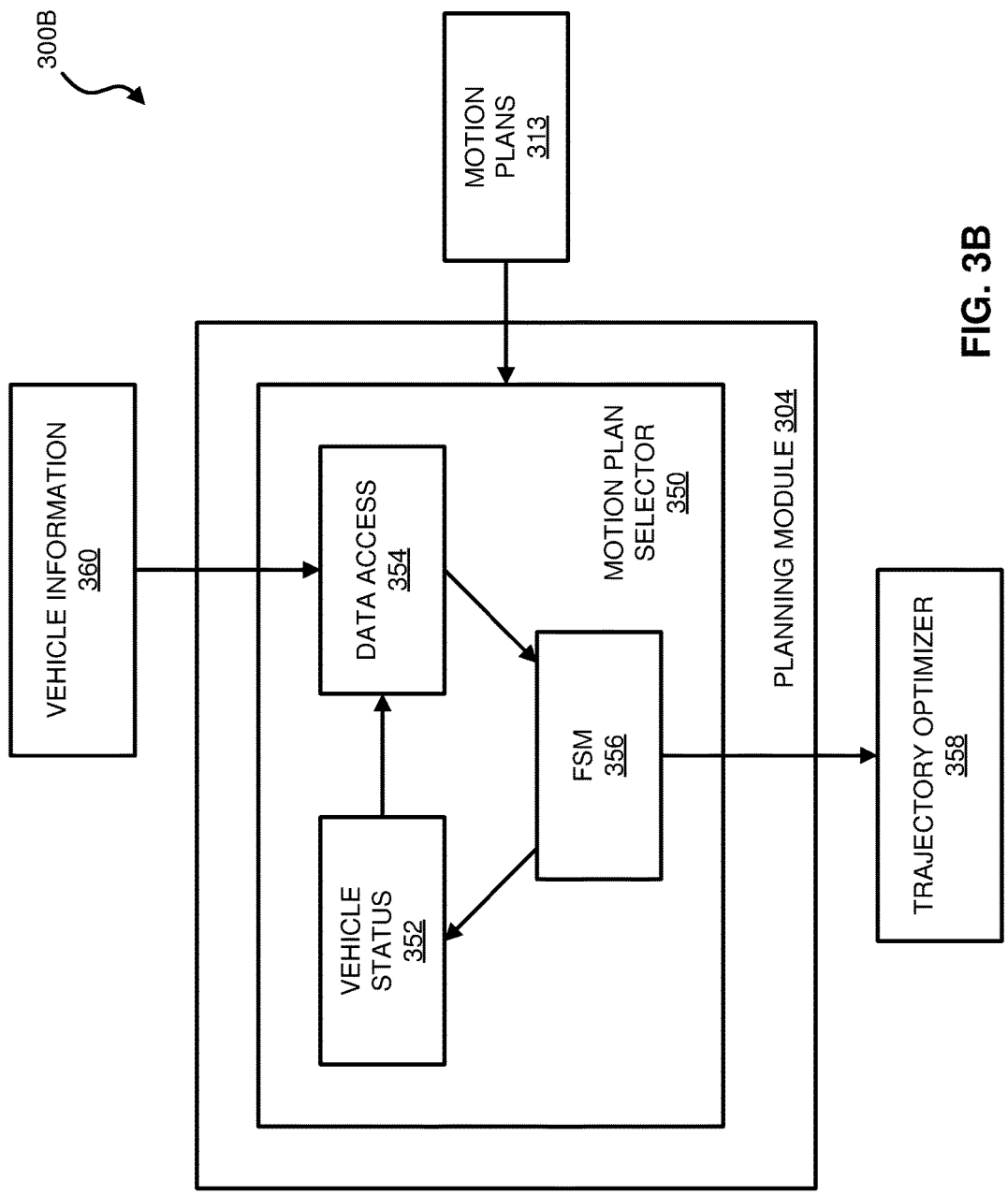
FIG. 3B is a block diagram illustrating in more detail a portion of the perception and planning system illustrated in FIG. 3A according to one embodiment.

FIG. 3B is a block diagram illustrating a detailed portion of the perception and planning system including the planning module 304 according to one embodiment. System 300B may be implemented as a part of autonomous vehicle 101 of FIG. 1 including, but is not limited to, perception and planning system 110, control system 111, and sensor system 115. Referring to FIG. 3B, the planning module 304 includes, but is not limited to, a motion plan selector 350. The motion plan selector 350 may include, but is not limited to, vehicle status 352, data access 354, and finite status machine (FSM) 356. System 300B may further include motion plans 313, trajectory optimizer 358, and vehicle information 360.

In one embodiment, the vehicle status 352 provides a current status of the autonomous vehicle to data access 354. When the vehicle is first started, the current status of the vehicle is in the initial state. The motion plan monitor 350 may read vehicle information 360 provided to data access 354, such as a current status of the autonomous vehicle, speed, acceleration, accumulation of times of failure for each upstream module, etc. The motion plan monitor 350 may read the vehicle information 360 from the data access 354, for example, at every planning cycle. The vehicle information 360 is a gateway module and gathers information via hardware such as sensors. The data access 354 is a combiner which combines information, converts the information to internal data and pushes the data to the FSM 356.

In one embodiment, the FSM 356 provides a current status or state of the autonomous vehicle according to the vehicle information 360 received from the data access 354. The FSM 356 may update the vehicle status after providing the current status. The FSM 356 may select the suitable motion plan from motion plans 313 according to the current vehicle status, and may provide the selected motion plan to the trajectory optimizer 358. The motion plans 313 may be stored in a memory such as memory 351. The trajectory optimizer 358 may process an optimization according to the output of the motion plan selector 350.

A motion plan includes information or parameters regarding how to control or drive an autonomous vehicle, such as, for example, speed, direction, curvature, stop distance, lane changing speed and distance, whether the vehicle should over take or yield, etc. For different driving environment or scenario, a suitable motion plan may be utilized to control an autonomous vehicle. Motion plans 313 may be created and compiled by a data analytics system such as data analytics system 103 offline based on the driving statistics collected from a variety of vehicles driven under a variety of driving environments.

By way of background, as a vehicle travels on the road, driving conditions can be varied and complicated depending, for example, on weather, daylight, traffic, roadway conditions, etc. Conventional autonomous driving systems read environment information from perception, and choose a plan according to some rules based on a current status. These conventional autonomous driving systems may work for simple situations. However, when using these systems, the inventors herein have found that a motion optimization of the vehicle may sometimes not be smooth. For example, when a vehicle indicates that it is traveling at a speed of 0 mph, this may indicate two different situations: (1) the vehicle has slowed down from a specific speed, or (2) the vehicle has just started and is still stopped. Using the conventional autonomous driving systems which are based on a current status of the vehicle, the same motion plan may be applied for both of these situations which may result in an unsmooth output.

Figure 4:
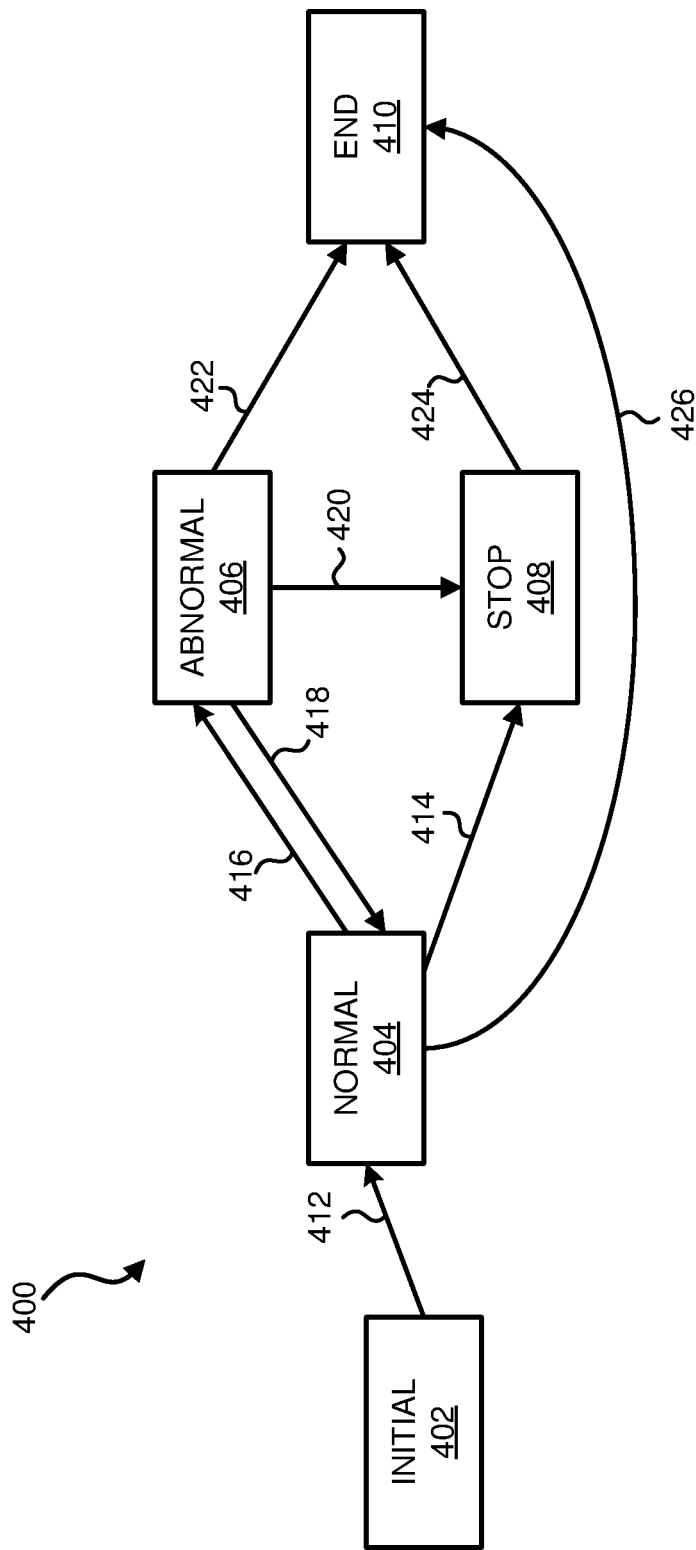
FIG. 4 is a state diagram illustrating different states of the autonomous vehicle according to one embodiment.

In an autonomous driving system according to one embodiment, different statuses or states are defined for the system. FIG. 4 shows a state diagram 400 illustrating different states of the autonomous driving system, as well as transitions between the states. When certain conditions are met, the autonomous driving system may transition between states, as described in more detail below. Each state may correspond with a specific motion plan to be selected, as described below. Also, a definition of each state may be dependent upon a current system and can change as the system evolves.

As shown in FIG. 4, the autonomous driving system may include, but is not limited to, states such as initial state 402, normal state 404, abnormal state 406, stop state 408, and end state 410. When the vehicle begins to operate, certain conditions are checked for a transition 412 from the initial state 402 to the normal state 404. The autonomous driving system may also select a motion plan for making the vehicle work, for example, during the transition 412.

As further illustrated in FIG. 4, the autonomous driving system may transition 416 from the normal state 404 to the abnormal state 406 or transition 414 from the normal state 404 to the stop state 408. For example, when the autonomous driving system is in the normal state 406 and the vehicle approaches a stop sign or traffic light, the autonomous driving system can control the vehicle to stop if certain conditions are satisfied. In another example, when the autonomous driving system is in the normal state 406 and a control module such as a mapping system does not receive data for a predetermined period of time, then the autonomous driving system can transition to the abnormal state 406. In this example, the condition is whether the mapping system has received data for the predetermined period of time. If this condition is satisfied, then the autonomous driving system can control the vehicle to perform a maneuver such as pulling over.

The autonomous driving system may also transition 420 from the abnormal state 406 to the stop state 408, or transition 418 from the abnormal state 406 to the normal state 404. In each of these cases, if certain conditions are satisfied, then a specific motion plan is implemented.

Finally, the autonomous driving system may transition 426 from the normal state 404 to the end state 410 in a case that the vehicle's mission is finished. Alternatively, the autonomous driving system may transition 422 from the abnormal state 406 to the end state 410 or transition 424 from the stop state 408 to the end state 410 when a transition from the abnormal state 406 to the normal state 404 or stop state 424 was not successful.

In the autonomous driving system, edges are built from state to state if a transition can be performed between the states. Each edge may include a satisfying set as an attribution. If an edge exists between two states, then a transition can be made between the two states. In some embodiments, a transition can be made from state to state only if there is an edge between the two states. For each of the edges between the states, there may be an associated plan for transition as well as one or more conditions to be satisfied according to the satisfying set.

In one embodiment, lookup tables such as lookup tables 500 and 600 shown in FIGS. 5 and 6, respectively, can be used to implement the transitions between states. Lookup table 500 may include transitions between states of the autonomous vehicle and corresponding motion plans such as plans A-H. As shown in lookup table 500, for each edge between states there is a corresponding motion plan for transition.

Lookup table 600 may include one or more categories of conditions related to the autonomous vehicle and corresponding next steps of the autonomous vehicle. In one embodiment, the categories of conditions may include a binary number indicating how many conditions are to be passed. There may be different types of conditions. Each condition is judged and a resulting binary number is output. If a condition is passed then a 1 is assigned, and if a condition is not passed then a zero is assigned. As a result, each category of conditions includes a binary number which represents a set of conditions that must be passed for the vehicle to pass from one state to another. Lookup table 600 may be used to determine which state is the next state based on the conditions. Based on the current state and/or the next state to which the vehicle transitions, a motion plan can be selected, for example, by motion plan selector 350 of FIG. 3, to drive the vehicle in a next road segment.

Examples of the conditions may include a speed type such as a low speed which is less than a predetermined speed, a normal speed, and a high speed which is greater than a predetermined speed. The conditions may also include an error type such as when a decision module fails more than 5 times. For every cycle, a result should be received from the module. If a message is not received for 5 cycles, then an error is assumed to have occurred. Another example of an error type condition is when a routing module fails more than 5 times. If, for example, no routing communications are received for an amount of time, then the vehicle may transition to the abnormal state. Of course, the error type condition is not limited to 5 cycles, and other number limits can be used.

The conditions may further include the weather of the operating environment of the vehicle, such as rain, snow, etc. The conditions may include a direction the vehicle is travelling (e.g., moving forward or reversing) where the motion plan would be different if the vehicle is backing up rather than moving forward. One condition may be whether the vehicle has been in a collision which would transition the vehicle into the abnormal state.

Other conditions may include acceleration or deceleration. If, for example, the vehicle is travelling at a high or above normal speed with high or above normal acceleration, then the motion plan may be a conservative plan. On the other hand, if the vehicle is travelling at a low speed and high or above normal acceleration, then the motion plan may be more aggressive. Of course, the foregoing conditions listed herein are merely example conditions, and other conditions may be used in the categories of conditions.

In one embodiment, for categories of conditions, one category cannot be a subset of another category. In this embodiment, the conditions in each category can overlap, but all of the conditions of one category cannot all be included in another category.

In lookup table 600, each category of conditions equals a set representing a number of conditions where each condition is represented by a binary number. For a current state, a next state is determined when one or more conditions become satisfied resulting in a binary number. The resulting binary number is matched with a column of the categories of conditions, and the corresponding state in the column is determined as the next state.

In one embodiment, the autonomous driving system uses a combination of current information coming from the vehicle and historical information such as information regarding a previous cycle to determine a first state of the vehicle and to determine whether one or more conditions have been satisfied. The historical information, including information such as trajectory, speed, history data, etc., is stored from the previous cycle. The autonomous driving system may also store the last state of a previous cycle and a condition for the last state.

In an example, if the vehicle is traveling from point a to point b, before the vehicle reaches point b the vehicle is moving at an initial speed, and when the vehicle reaches point b the vehicle is traveling at a speed of 0 mph. By storing the initial speed, the autonomous driving system can determine whether the vehicle is just stopping or just going. The historical information may be used as context to determine whether the vehicle is about to start or is about to stop. By taking the historical information into account in determining satisfaction of conditions, it is possible to determine the next state.

By virtue of the foregoing arrangement, the autonomous driving system, using the knowledge of history status and information, can choose a reasonable, and typically a most suitable, motion plan in a current situation of an autonomous vehicle. A motion plan includes information or parameters regarding how to control or drive an autonomous vehicle, such as, for example, speed, direction, curvature, stop distance, lane changing speed and distance, whether the vehicle should over take or yield from another vehicle, etc.

In one embodiment, a motion plane would consider the vehicle chassis information (e.g., speed, acceleration/deceleration, heading, location, etc.), perception information (e.g., obstacles' location, speed, heading and its motion trajectory), detection information (e.g., dependency module's status) and its history information. The history information can be a history list of planned trajectory and its corresponding states. The output of a motion plan would be a vector of points, which include not only the planned positions, but also its speed, heading and station.

In one embodiment, each state has its own motion plan. It is possible that each state specifically may have different parameters or algorithms under different transition in future. For example, assuming the current status is a "Normal" state, if this state was transitioned from an "Abnormal" state, a very careful or conservative motion plan may be selected. If the state was transition from an "Init" state, the system would detect if it is off the road, and select a motion plan to let it on the road (e.g., from park lot). If the state was transitioned from a "Normal" state, it means the vehicle is good in road, and will keep its motion plan which is used until a system report a change.

In one embodiment, the state, the motion plan of the state, and the satisfying set of conditions of the state can be configured in a JSON (JavaScript Object Notation) file. This can provide the advantageous effect of providing easy configuration of the autonomous driving system.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions. Lookup tables 500 and 600 may be maintained in a persistent storage device, loaded in a memory, and accessed by motion plan selector 350 in selecting a motion plan for a next planning section.

Figure 7:
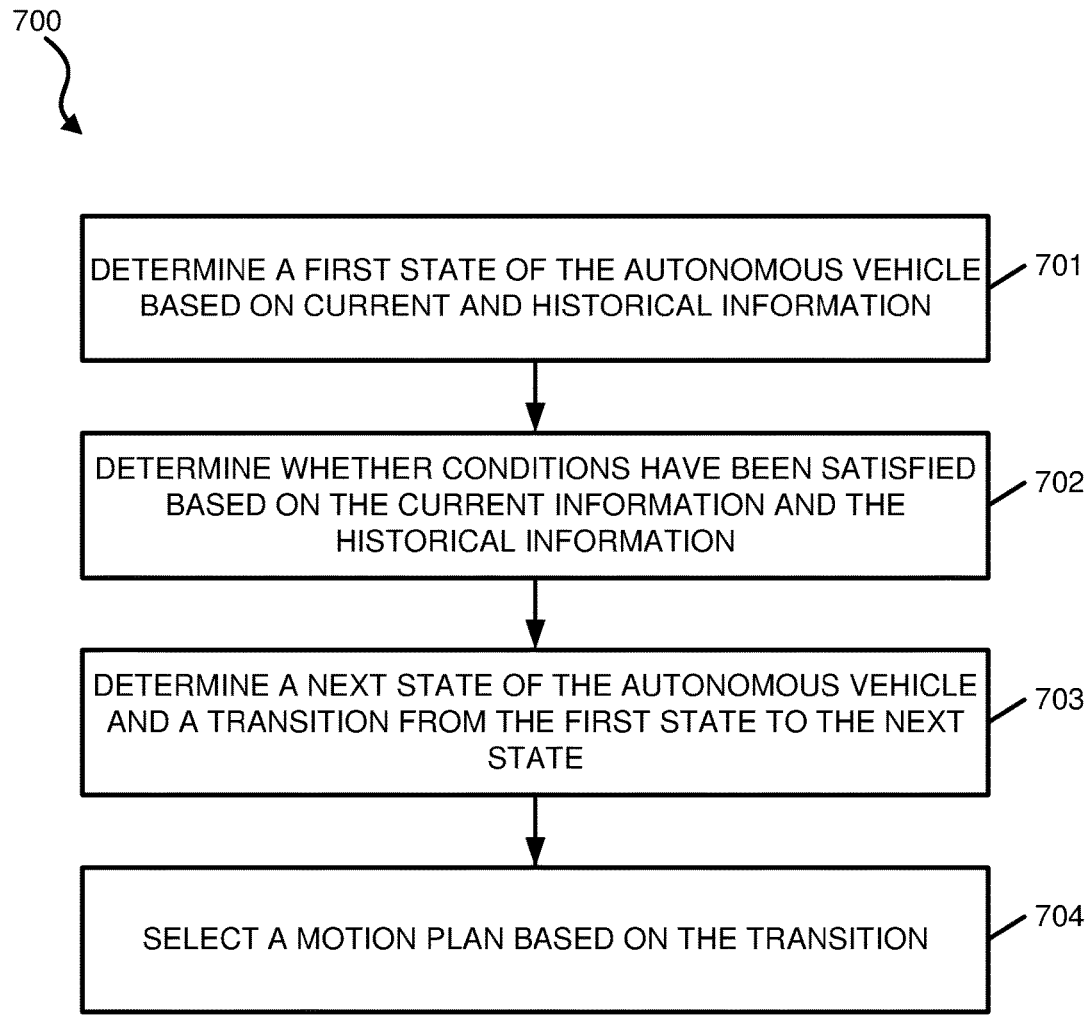
FIG. 7 is a flow diagram illustrating an example process for determining a drive motion plan of the autonomous vehicle according to one embodiment.

FIG. 7 illustrates a flow diagram for explaining an example process for determining a drive motion plan for an autonomous vehicle according to an embodiment herein. In this regard, the following embodiments may be described as a process 700, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Process 700 may be performed by processing logic that includes hardware (e.g. circuitry, dedicated logic, etc.), software (e.g., embodied on a non-transitory computer readable medium), or a combination thereof.

Referring to FIG. 7, at block 701, a first state of the autonomous vehicle from among a number of states is determined based on current information of the autonomous vehicle and historical information of the autonomous vehicle. The number of states may include, for example, an initial state, a stop state, a normal state, an abnormal state or an end state (e.g., states 402, 404, 406, 408 and 410 of FIG. 4). The current information may include, for example, a current trajectory of the autonomous vehicle, a current speed of the autonomous vehicle, information indicating whether the autonomous vehicle is currently accelerating, information indicating whether the autonomous vehicle is currently decelerating, and a current state of the autonomous vehicle. The historical information may include, for example, a previous trajectory of the autonomous vehicle, a previous speed of the autonomous vehicle, information indicating whether the autonomous vehicle was previously accelerating, information indicating whether the autonomous vehicle was previously decelerating, a previous state of the autonomous vehicle, and previous conditions satisfied by the autonomous vehicle.

At block 702, a determination is made as to whether one or more conditions have been satisfied based on the current information and the historical information. The one or more conditions may include, for example, at least one of (a) a speed of the autonomous vehicle, (b) an error of the autonomous vehicle, (c) information regarding weather in an operating environment of the autonomous vehicle, (d) a direction of movement of the autonomous vehicle, (e) information indicating that the autonomous vehicle is involved in a collision, and (f) information indicating whether the autonomous vehicle is accelerating or decelerating.

At block 703, a next state of the autonomous vehicle from among the number of states is determined based on the one or more conditions that are determined to have been satisfied. The next state of the autonomous vehicle may be determined using a first lookup table (e.g., lookup table 600 of FIG. 6) storing a correspondence between the one or more conditions and the next state of the autonomous vehicle. The one or more conditions may be represented in the first lookup table as a binary number.

Also at block 703, a transition from the first state to the next state is determined based on the one or more conditions that are determined to have been satisfied.

At block 704, one of multiple motion plans is selected based on the transition of the autonomous vehicle. The multiple motion plans are stored in a memory (e.g., memory 351 of FIG. 3A). The motion plan may be selected from the multiple motions plans using a second lookup table (e.g., lookup table 500 of FIG. 5) storing a correspondence between the transition of the autonomous vehicle and the motion plan.

Figure 8:
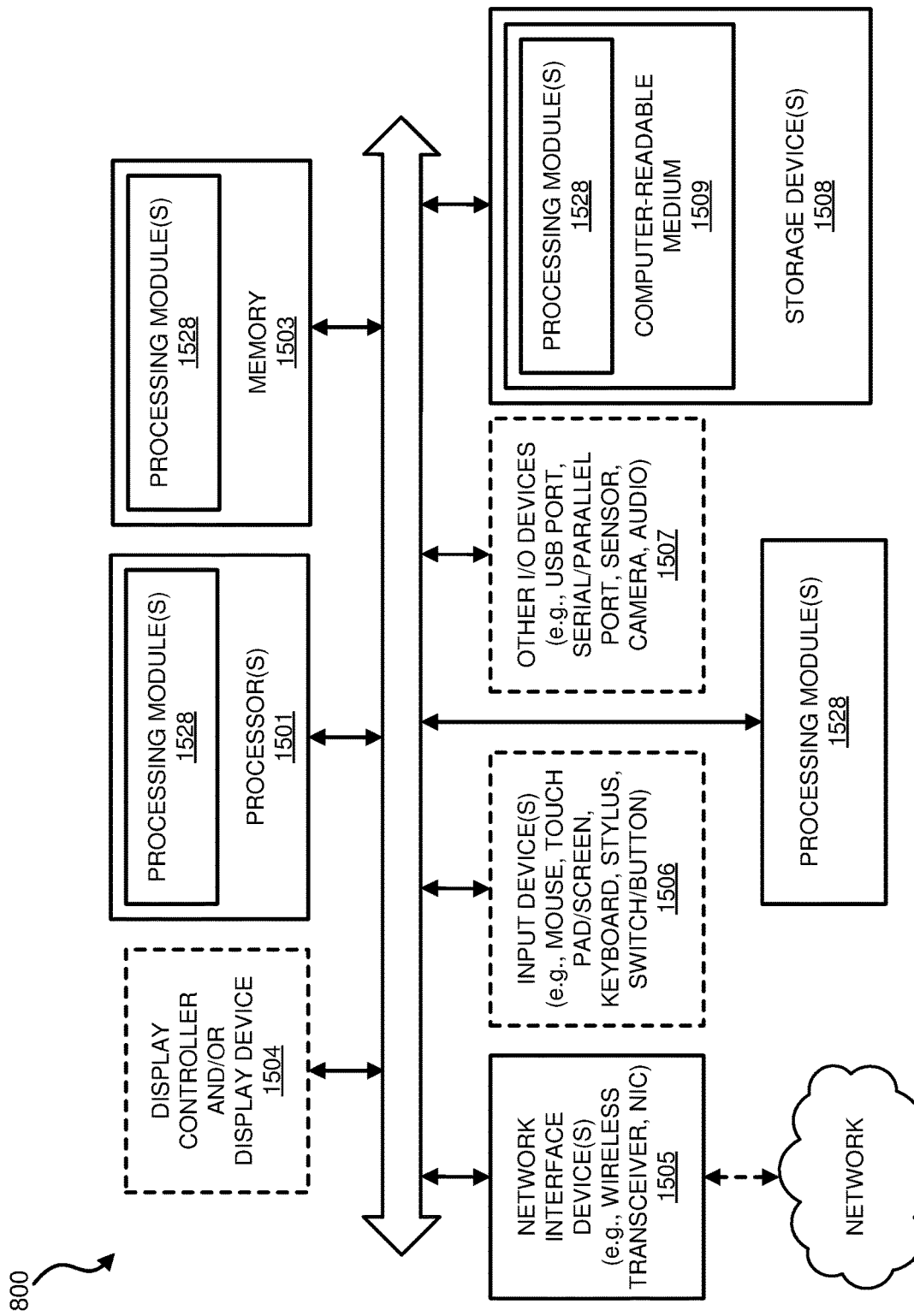
FIG. 8 is a block diagram illustrating a data processing system according to one embodiment.

FIG. 8 is a block diagram illustrating an example of a data processing system which may be used with one embodiment. For example, system 800 may represent any of data processing systems described above performing any of the processes or methods described above, such as, for example, perception and planning system 110 or any of servers 103-104 of FIG. 1. System 800 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 800 is intended to show a high level view of many components of the computer system. However, it is to be understood that additional components may be present in certain implementations and furthermore, different arrangement of the components shown may occur in other implementations. System 800 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 800 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 800 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 800 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 800.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 304. Processing module/unit/logic 1528 may also reside, completely or at least partially, within memory 1503 and/or within processor 1501 during execution thereof by data processing system 800, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 800 is illustrated with various components of a data processing system, it is not intended to represent any particular architecture or manner of interconnecting the components; as such details are not germane to embodiments. It will also be appreciated that network computers, handheld computers, mobile phones, servers, and/or other data processing systems which have fewer components or perhaps more components may also be used with embodiments.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method of operating an autonomous vehicle, the method comprising:

determining a first state of the autonomous vehicle from among a number of states of a finite state machine of the autonomous vehicle, wherein the first state of the finite state machine is determined based on current information of the autonomous vehicle and historical information of the autonomous vehicle;

determining whether one or more conditions have been satisfied based on the current information and the historical information;

determining, based on the one or more conditions that are determined to have been satisfied, a next state of the autonomous vehicle from among the number of states and a state transition of the autonomous vehicle from the first state to the next state, wherein one of the states is an abnormal state indicating no routing communication is received for a predetermined period of time, wherein the next state of the autonomous vehicle is determined using a first lookup table storing a correspondence between the one or more conditions and the next state of the autonomous vehicle, wherein the one or more conditions are represented in the first lookup table as a binary number, wherein the one or more conditions are categorized into predetermined categories of conditions and one category cannot be a subset of another category of conditions, and wherein the next state of the autonomous vehicle is determined based on a result from each category of conditions;

selecting, based on the state transition of the autonomous vehicle from the first state to the next state, one of a plurality of predetermined motion plans, each of the predetermined motion plans corresponding to one of a plurality of state transitions from a particular state to another particular state of the finite state machine; and generating a trajectory based on the selected motion plan to control the autonomous vehicle to drive according to the trajectory.

2. The method of claim 1 wherein the number of states includes an initial state, a stop state, a normal state, an abnormal state or an end state.

3. The method of claim 1 wherein the one or more conditions include at least one of (a) a speed of the autonomous vehicle, (b) an error of the autonomous vehicle, (c) information regarding weather in an operating environment of the autonomous vehicle, (d) a direction of movement of the autonomous vehicle, (e) information indicating that the autonomous vehicle is involved in a collision, or (f) information indicating whether the autonomous vehicle is accelerating or decelerating.

4. The method of claim 1 wherein the motion plan is selected from the plurality of motions plans using a second lookup table storing a correspondence between the state transition of the autonomous vehicle and the motion plan.

5. The method of claim 1 wherein the current information includes a current trajectory of the autonomous vehicle, a current speed of the autonomous vehicle, information indicating whether the autonomous vehicle is currently accelerating, information indicating whether the autonomous vehicle is currently decelerating, and a current state of the autonomous vehicle.

6. The method of claim 1 wherein the historical information includes a previous trajectory of the autonomous vehicle, a previous speed of the autonomous vehicle, information indicating whether the autonomous vehicle was previously accelerating, information indicating whether the autonomous vehicle was previously decelerating, a previous state of the autonomous vehicle, and previous conditions satisfied by the autonomous vehicle.

7. A non-transitory machine-readable medium having instructions stored therein, which when executed by a processor, cause the processor to perform operations, the operations comprising:
   determining a first state of the autonomous vehicle from among a number of states of a finite state machine of the autonomous vehicle, wherein the first state of the finite state machine is determined based on current information of the autonomous vehicle and historical information of the autonomous vehicle;
   determining whether one or more conditions have been satisfied based on the current information and the historical information;
   determining, based on the one or more conditions that are determined to have been satisfied, a next state of the autonomous vehicle from among the number of states and a state transition of the autonomous vehicle from the first state to the next state, wherein one of the states is an abnormal state indicating no routing communication is received for a predetermined period of time, wherein the next state of the autonomous vehicle is determined using a first lookup table storing a correspondence between the one or more conditions and the next state of the autonomous vehicle, wherein the one or more conditions are represented in the first lookup table as a binary number, wherein the one or more conditions are categorized into predetermined categories of conditions and one category cannot be a subset of another category of conditions, and wherein the next state of the autonomous vehicle is determined based on a result from each category of conditions;
   selecting, based on the state transition of the autonomous vehicle from the first state to the next state, one of a plurality of predetermined motion plans, each of the predetermined motion plans corresponding to one of a plurality of state transitions from a particular state to another particular state of the finite state machine; and
   generating a trajectory based on the selected motion plan to control the autonomous vehicle to drive according to the trajectory.

8. The non-transitory machine-readable medium of claim 7 wherein the number of states includes an initial state, a stop state, a normal state, an abnormal state or an end state.

9. The non-transitory machine-readable medium of claim 7 wherein the one or more conditions include at least one of (a) a speed of the autonomous vehicle, (b) an error of the autonomous vehicle, (c) information regarding weather in an operating environment of the autonomous vehicle, (d) a direction of movement of the autonomous vehicle, (e) information indicating that the autonomous vehicle is involved in a collision, or (f) information indicating whether the autonomous vehicle is accelerating or decelerating.

10. The non-transitory machine-readable medium of claim 7 wherein the motion plan is selected from the plurality of motions plans using a second lookup table storing a correspondence between the state transition of the autonomous vehicle and the motion plan.

11. The non-transitory machine-readable medium of claim 7 wherein the current information includes a current trajectory of the autonomous vehicle, a current speed of the autonomous vehicle, information indicating whether the autonomous vehicle is currently accelerating, information indicating whether the autonomous vehicle is currently decelerating, and a current state of the autonomous vehicle.

12. The non-transitory machine-readable medium of claim 7 wherein the historical information includes a previous trajectory of the autonomous vehicle, a previous speed of the autonomous vehicle, information indicating whether the autonomous vehicle was previously accelerating, information indicating whether the autonomous vehicle was previously decelerating, a previous state of the autonomous vehicle, and previous conditions satisfied by the autonomous vehicle.

13. A data processing system, comprising:
   a processor; and
   a memory coupled to the processor to store instructions, which when executed by the processor, cause the processor to perform operations, the operations including
      determining a first state of an autonomous vehicle from among a number of states of a finite state machine of the autonomous vehicle, wherein the first state of the finite state machine is determined based on current information of the autonomous vehicle and historical information of the autonomous vehicle,
      determining whether one or more conditions have been satisfied based on the current information and the historical information,
      determining, based on the one or more conditions that are determined to have been satisfied, a next state of the autonomous vehicle from among the number of states and a state transition of the autonomous vehicle from the first state to the next state, wherein one of the states is an abnormal state indicating no routing communication is received for a predetermined period of time, wherein the next state of the autonomous vehicle is determined using a first lookup table storing a correspondence between the one or more conditions and the next state of the autonomous vehicle, wherein the one or more conditions are represented in the first lookup table as a binary number, wherein the one or more conditions are categorized into predetermined categories of conditions and one category cannot be a subset of another category of conditions, and wherein the next state of the autonomous vehicle is determined based on a result from each category of conditions,
      selecting, based on the state transition of the autonomous vehicle from the first state to the next state, one of a plurality of predetermined motion plans, each of the predetermined motion plans corresponding to one of a plurality of state transitions from a particular state to another particular state of the finite state machine, and
      generating a trajectory based on the selected motion plan to control the autonomous vehicle to drive according to the trajectory.

14. The data processing system of claim 13 wherein the number of states includes an initial state, a stop state, a normal state, an abnormal state or an end state.

15. The data processing system of claim 13 wherein the one or more conditions include at least one of (a) a speed of the autonomous vehicle, (b) an error of the autonomous vehicle, (c) information regarding weather in an operating environment of the autonomous vehicle, (d) a direction of movement of the autonomous vehicle, (e) information indicating that the autonomous vehicle is involved in a collision, or (f) information indicating whether the autonomous vehicle is accelerating or decelerating.

16. The data processing system of claim 13 wherein the motion plan is selected from the plurality of motions plans using a second lookup table storing a correspondence between the state transition of the autonomous vehicle and the motion plan.

17. The data processing system of claim 13 wherein the current information includes a current trajectory of the autonomous vehicle, a current speed of the autonomous vehicle, information indicating whether the autonomous vehicle is currently accelerating, information indicating whether the autonomous vehicle is currently decelerating, and a current state of the autonomous vehicle.

18. The data processing system of claim 13 wherein the historical information includes a previous trajectory of the autonomous vehicle, a previous speed of the autonomous vehicle, information indicating whether the autonomous vehicle was previously accelerating, information indicating whether the autonomous vehicle was previously decelerating, a previous state of the autonomous vehicle, and previous conditions satisfied by the autonomous vehicle.

\* \* \* \* \*